Patented Mar. 28, 1944

2,345,222

UNITED STATES PATENT OFFICE 2,345,222

PRODUCTION OF STEEL

Marvin J. Udy, Niagara Falls, N. Y.

No Drawing. Application May 26, 1941,
Serial No. 395,312

5 Claims. (Cl. 75—54)

This invention relates to metallurgy and has for an object the provision of certain improvements in metallurgical methods or processes and products. More particularly, the invention contemplates the provision of certain improvements in methods or processes and products suitable for use in the production of steel. A particular object of the invention is to provide an improved method or process for removing silicon and carbon from iron of the type of blasts furnace iron and cupola iron.

Iron used in the production of steel customarily is produced in furnaces of the type of blast furnaces and cupola furnaces. Iron thus produced contains relatively large amounts of silicon and carbon which must be removed or reduced in amount in order to produce suitable steel products. Thus, for example, iron of the type of blast furnace iron and cupola iron may contain carbon in amount equal to about two and one-half to three and one-half percent (2.5 to 3.5%) by weight and silicon in amount equal to about one to three and one-quarter percent (1.0 to 3.25%) by weight.

In the production of steel, iron of the type produced in blast furnaces and cupolas is treated ultimately in steel making furnaces of the type of open hearth furnaces and electric furnaces in which steel making furnaces final adjustments of the silicon and carbon contents may be made. If the iron of the type of blast furnace iron and cupola iron with its relatively high percentages of silicon and carbon is introduced directly into the steel making furnace, the capacity of the furnace for steel production is limited by excessive volumes of slag which must be produced in the removal or elimination of relatively large amounts of silicon and carbon. Therefore, in order to avoid limiting the capacities of the steel making furnaces for steel production, it has been proposed to subject the iron of the type of blast furnace iron and cupola iron to a preliminary treatment, prior to introduction into the steel making furnace, to effect the removal of substantial proportions of the silicon and carbon.

According to some present practices, preliminary treatment of iron of the type of blast furnace iron and cupola iron for silicon and carbon removal involves treatment of the iron in Bessemer converters in which silicon and carbon are oxidized by means of air blown through the metal in the molten state. Silicon thus is oxidized to silica ($SiO_2$) which enters a slag layer on the surface of the bath of molten metal and carbon is converted to an oxide form which is gaseous and which passes out of the converter into the atmosphere.

It has been proposed also to subject iron of the type of blast furnace iron and cupola iron to a preliminary treatment with iron oxide to oxidize and remove silicon and carbon prior to introduction of the iron into the steel making furnaces. This proposed procedure has not been particularly successful because of the high melting point of the silica produced by oxidation and because of the high melting points of and consequent high viscosities of the slags produced. Slag thus produced is sticky and stringy and difficult to separate from the metal. Consequently, substantial amounts of iron may be lost with the slag removed if complete separation of the slag from the metal is attempted, or substantial amounts of the slag are retained with the metal and delivered to the steel making furnace with substantial nullification of the effects of the preliminary treatment if complete separation of the metal and slag is not attempted.

The present invention provides a simple and effective method of removing silicon and carbon from iron of the type of blast furnace and cupola iron prior to introduction of the iron into steel making furnaces. The invention also provides improved products which may be employed advantageously for the removal of silicon and carbon from iron or for the adjustment of silicon and carbon contents at any stage of production of iron and steel in which the iron or steel is molten.

According to the method or process of the invention, iron of the type of blast furnace iron and cupola iron is subjected while molten to the action of a metallurgical product in the form of a mixture of iron oxide and a compound containing an alkali metal oxide as a constituent. Any suitable form of iron oxide may be employed. Thus, for example, iron oxide may be employed in the form of ferric oxide ($Fe_2O_3$) or in the form of magnetic iron oxide (mill scale) ($Fe_3O_4$). Compounds containing alkali metal oxide should be of the type in which the alkali metal oxide becomes available for combination with silica produced by oxidation of silicon to form alkali metal silicate under the influence of the hot molten metal and under the conditions of use of the compound. Suitable compounds containing available alkali metal oxide include sodium nitrate, sodium silicate, sodium carbonate and sodium bicarbonate. Sodium silicate preferably is employed in the form of the metasilicate ($Na_2O \cdot SiO_2$).

Metallurgical products of the invention comprise iron oxide and one or more compounds containing available alkali metal oxide. Lime (CaO) or fluorspar (calcium fluoride $CaF_2$) or both may be included in the products. Products containing sodium nitrate may include, also, some silicon, in the form of ferrosilicon for example.

The products of the invention may be employed in any suitable physical forms. Preferably, the components of the products are employed in the form of intimate mixtures. The products of the invention may be employed in the form of loose powders comprising finely divided solid particles of the various components in intimate admixture, or the products of the invention may be employed in the form of powders packed in bags or other containers, or the products of the invention may be employed in the form of agglomerates or briquettes of any suitable sizes and shapes.

In the preferred products in the invention, the components preferably are in the form of particles sufficiently small in size to pass a 100-mesh screen. The mixtures of components of the products of the invention preferably are formed by grinding together all of the components to produce a composite mass of particles largely, or entirely, small enough to pass a 100-mesh screen.

When the products of the invention are produced and employed in the form of agglomerates or briquettes, the compound containing available alkali metal oxide preferably serves as the bonding agent. Agglomerates or briquettes may be formed by mixing the components intimately, shaping the mixture into agglomerates of suitable sizes and shapes under pressure, heating the shaped products to temperatures sufficiently high to melt the compound containing available alkali metal oxide and cooling the heated products. Shaping of the products prior to heating may be facilitated by wetting the intimate mixtures of components with an aqueous liquid in amount equal to about one to five percent (1 to 5%) of the weight of the mass to be shaped. Satisfactory agglomerates or briquettes may be produced simply by shaping a wet mixture of the components and heating the shaped products to temperatures sufficiently high to drive off all water but not high enough to melt the compound containing available alkali metal oxide. Any suitable organic or inorganic bonding agent may be employed in forming agglomerates or briquettes. Molasses water (an aqueous solution of molasses), tar, pitch and asphalt are suitable bonding agents but their use is not particularly desirable because their elimination requires consumption of oxidizing material.

Intimate mixing of the components promotes effective oxidation of the silicon and carbon of molten iron and effective removal from the metal of the silica produced by oxidation by placing at the points of oxidation of silicon and production of silica alkali metal oxide available for combining with the silica and for removing the silica from contact with the metal. The use of the compound containing available alkali metal oxide as the bonding agent promotes intimate contact of the components, and bonding of the components effects oxidation of the silicon and carbon of molten iron at controlled rates.

In the process of the invention, the iron oxide of the metallurgical product employed functions as a source of oxygen for oxidizing the silicon and carbon. When sodium nitrate is included in the metallurgical product employed, it functions both as a source of oxygen for oxidizing purposes and as source of sodium oxide for combining with silica produced by oxidation of the silicon. The reaction of sodium nitrate with silicon is highly exothermic and sodium nitrate may be used advantageously to provide additional heat when necessary or desirable. When the use of sodium nitrate for the purpose of providing additional heat is desirable, some silicon, in the form of ferrosilicon, may be included as a component of the metallurgical product employed. When sodium silicate ($Na_2SiO_3$) or sodium carbonate is included as a component of the metallurgical product employed, it functions as a source of sodium oxide for combining with silica produced by oxidation of the silicon. Lime may be incorporated in a metallurgical product of the invention for the purpose of combining with silica to produce calcium silicate, and fluorspar may be included for the purpose of increasing the fluidity of slag produced. Compounds such as sodium nitrate, sodium silicate and sodium carbonate may function, also, as bonding agents for the components of the mixtures when the products are employed in the form of agglomerates or briquettes.

The amount of any product of the invention which may be employed in carrying out a process of the invention and the relative proportions of various components employed in forming that product will be determined, within certain limits, by the results sought to be accomplished. Generally, in carrying out a process of the invention, a particular product will be employed in amount sufficient to provide iron oxide or iron oxide and sodium nitrate containing available oxygen sufficient to accomplish the desired degree of oxidation and removal of silicon and carbon. One or more compounds containing available alkali metal oxide, such as sodium nitrate, sodium silicate and sodium carbonate will be employed in amount sufficient to effect the production of a low-melting point slag which will be sufficiently fluid at the temperature of the operation to facilitate clean separation of the slag and metal. Lime or fluorspar or both may be included for the purpose of modifying the characteristics of the slag, and iron oxide may be employed in large or small excess for the same purpose. When the iron is relatively cold, additional heat may be supplied to raise its temperature by incorporating in the product employed silicon and sodium nitrate in amount at least sufficient to oxidize the silicon.

The method or process of the invention may be utilized, if desired, to permit elimination of converters for removal of silicon and carbon in those plants provided with converters and to permit the production of uniform steel products with greater steel furnace capacity in those plants not provided with converters. By providing for the effective preliminary removal of silicon and carbon from iron of the type of blast furnace iron and cupola iron which otherwise would be introduced directly into the steel furnace, the invention provides for an increase of as much as twenty percent (20%) in the steel making capacity of the furnace.

The metallurgical products of the invention may be brought into contact with the molten iron from which silicon and carbon is to be used in any suitable manner, as, for example, by placing the products on the surfaces of molten baths of the iron or by pouring the molten iron into contact with the products in a ladle. In the preferred process of the invention, the metallurgical product to be employed is placed in a ladle and the molten iron is poured into the ladle and into contact with the product therein. This procedure produces effective contact and mixing of the molten iron with the product.

In carrying out a process in accordance with the invention, the molten iron preferably is employed at a temperature in the range 2500° F. to 3200° F. The composition of the metallurgical product employed is adjusted to provide a fluid slag at the temperature of the molten iron undergoing treatment.

The following examples illustrate the process of the invention employing products of the invention:

Example I

A product of the invention was formed by grinding together 35.6 pounds of mill scale ($Fe_3O_4$) and 14.5 pounds of sodium nitrate to form an intimate mixture of particles small enough to pass a 100-mesh screen. The resulting mixture was shaped into the form of briquettes under pressure and heated to a temperature above the melting point but below the decomposition point of sodium nitrate.

The briquettes, after cooling and solidification of the sodium nitrate were placed in a ladle, and a 200 pound charge of molten blast furnace iron (containing 3.0% silicon and 3.7% carbon) at a temperature of about 3000° F. was poured into the ladle and into contact with the briquettes therein. When the reaction was completed, slag was removed and the metal analyzed. Analysis of the metal indicated removal of about eighty percent (80%) of the silicon and seventy-five percent (75%) of the carbon.

Example II

Similar results were obtained when a similar quantity of iron of the same composition and temperature was poured into a ladle containing briquettes comprising an intimate mixture of mill scale ($Fe_3O_4$) and sodium carbonate and containing 64 pounds of mill scale and 12 pounds of sodium carbonate. The briquettes were formed by grinding together the mill scale and sodium carbonate to form a mass of particles small enough to pass a 100-mesh screen, wetting the mass with water, shaping the wet mass under pressure and heating the shaped products to a temperature slightly higher than the melting temperature of sodium carbonate.

I claim:

1. The method of treating iron containing not less than about two and one-half percent of carbon and one percent of elemental silicon to remove silicon and carbon contained therein which comprises subjecting the iron while molten to the action of a mixture of materials comprising iron oxide, calcium oxide and sodium silicate.

2. The method of treating iron containing not less than about two and one-half percent of carbon and one percent of elemental silicon to remove elemental silicon and carbon contained therein which comprises subjecting the iron while molten to the action of a mixture of materials comprising iron oxide, elemental silicon-containing material and sodium nitrate.

3. The method of treating iron containing not less than about two and one-half percent of carbon and one percent of elemental silicon to remove elemental silicon and carbon contained therein which comprises subjecting the iron while molten to the action of a mixture of materials comprising iron oxide, elemental silicon-containing material, calcium oxide and sodium nitrate.

4. A metallurgical product suitable for use in the treatment of molten iron containing not less than about two and one-half percent of carbon and one percent of elemental silicon for the removal of silicon and carbon contained therein, comprising particles of iron oxide and particles of silicon-containing material intimately associated with and bonded together by means of sodium nitrate, the silicon of the silicon containing material and the sodium nitrate being present in amounts and proportions such as to be capable of reacting exothermically upon contact of the product with the molten iron, and the silicon being present in amount not substantially in excess of that required for reaction with the sodium nitrate.

5. A metallurgical product suitable for use in the treatment of molten iron containing not less than about two and one-half percent of carbon and one percent of elemental silicon for the removal of silicon and carbon contained therein, consisting of particles of finely divided iron oxide, finely divided calcium oxide and calcium fluoride intimately associated with and bonded together by means of one or more compounds of the group consisting of sodium nitrate, sodium silicate and sodium carbonate.

MARVIN J. UDY.